Figure 1:
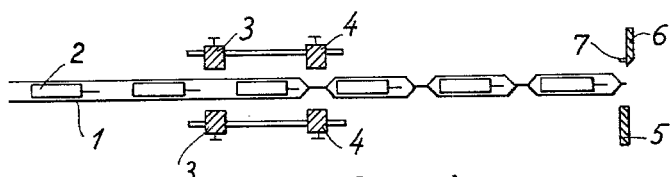

Jan. 18, 1966     H. GRAM     3,229,442
METHOD OF PACKING ARTICLES, AND APPARATUS
FOR CARRYING OUT THE METHOD
Filed Aug. 10, 1962     2 Sheets-Sheet 1

INVENTOR.
Hans Gram
BY
Watson, Cole, Grindle & Watson
ATTORNEYS

United States Patent Office 3,229,442
Patented Jan. 18, 1966

3,229,442
METHOD OF PACKING ARTICLES, AND APPARATUS FOR CARRYING OUT THE METHOD
Hans Gram, Vojens, Denmark, assignor to Brodrene Gram A/S, Vojens, Denmark
Filed Aug. 10, 1962, Ser. No. 216,258
Claims priority, application Denmark, Aug. 15, 1961, 3,289/61
3 Claims. (Cl. 53—28)

This invention relates to a method of packing articles, in which the articles are placed at a mutual spacing in a tubular packing material which is fed forward intermittently, whereafter the tube is heated by means of heating members in the zones between the articles and is thereafter compressed and cooled in the same zones by means of pressing members to form heat sealing seams extending transversely of the tube.

In a known method of this type the heating is performed by means of heating elements that may be arranged in the form of two sets, each set being provided on a roller individual thereto. These rollers are rotated in synchronism with the feeding of the packing tube in such a manner that, in the periods of rest of the tube, the heating elements are in positions opposite one another with the partly compressed tube therebetween so that the heating is performed when the packing tube is stationary. During the feeding movement of the tube the rollers perform an intermittent rotary motion so that, when the packing tube is again stopped, two heating elements are again in opposed positions with the tube therebetween. It is also possible, however, to use two heating elements only, which are arranged in positions opposite one another and are not movable in the longitudinal direction of the tube but are capable of being moved towards and away from one another, these heating elements being moved towards one another for the purpose of heating the tube while the latter is stationary.

After the said heat treatment has taken place, the packing tube is introduced between two sets of endless chains each carrying a plurality of pressure shoes, the mutual spacing of which corresponds to the spacing of the heated portions of the packing tube, i.e., to the length of the articles to be packed. The two sets of chains run parallel to one another along a certain distance, and at the entrance to this the sets of chains move the pressure shoes in between the articles for the purpose of compressing and cooling the heated tube portions whereby the said heat sealing seams are formed transversely of the tube.

This known method is on the whole relatively satisfactory but it is not possible, with the described movement of the heating members and the pressing members, to vary the distance between the seams, i.e., to perform an adjustment when changing over to articles of a different size.

It is the object of the invention to provide a method in which a change-over to the packing of articles of a different size can easily be performed. With this object in view, according to the invention, the heating members and the pressing members are moved in the feeding direction of the tube through a distance equal to the mutual spacing of the articles while heating the tube behind an article and compressing the tube in front of the article (as viewed in the feeding direction), whereafter the heating members and the pressing members are withdrawn from the tube and are moved backwards through the said distance against the feeding direction of the tube.

Thus, according to the invention, the heating members and the pressing members are caused to perform a reciprocating movement simultaneously at a stroke equal to the distance from the heating members to the pressing members whereby a change-over to articles of a different size may easily be performed, viz., by changing the distance between the pressing members and the heating members and at the same time similarly changing the stroke of the reciprocating movement. An additional advantage of the method according to the invention is that the heating and compression and cooling are performed while the packing tube is being moved, whereby the heating and compressing times may be extended, or the intermission between the movements may be reduced so that the speed of production may be increased as compared with the known method referred to where the heating takes place while the tube is stationary.

In the known method referred to, the tube is cut through along the seams while the tube is stationary, in order to separate the individually packed articles. If such cutting or severing is desired, it is proposed, according to the invention, simultaneously with the cutting to perform a clamping of the end of the tube formed by the cutting, which clamping is maintained during the return movement of the heating and pressing members. In this manner, the cutting operation is utilized for holding the packing tube so that this is positively prevented from being moved against its feeding direction during the return movement of the heating and pressing members.

According to the invention, the clamping may be terminated before the heating and pressing means are re-engaged with the tube, and in the case of stoppage of operation, the operational cycle may be terminated at the point where the clamping has ceased and before the heating and pressing members are re-engaged with the tube. Hereby the advantage is obtained that the packing tube is free, or in other words is not clamped, when the operation is stopped, so that the packing tube, or the sheet of material from which this is made, can be moved freely, e.g., when the sheet of material is to be introduced into the machine before starting the packing operation.

The invention also relates to an apparatus suitable for carrying out the described method. The apparatus is of the type having means for placing a row of articles at a mutual spacing in a tubular packing material, and heating and pressing means capable of being engaged with and withdrawn from the tube for the purpose of making heat sealing seams transversely of the tube between the articles. According to the invention, the heating and pressing members are connected with each other in such a manner that the distance from the heating members to the pressing members is adjustable, the heating and pressing members being connected with transmission means for producing a reciprocating movement of the heating and pressing members, the stroke of said reciprocating movement being adjustable.

It will be understood that change-over to articles of a different length will necessitate adjustment of the distance between the position at which the articles are initially placed by the means serving therefor, and the starting position of the reciprocating movement. Such adjustment may of course be effected by displacing the said article placing means relative to the stopping position of the reciprocating movement, but according to the invention it is preferred to make the starting position of the reciprocating movement adjustable relative to the article placing means, because the necessity of displacing the whole apparatus is thereby avoided, and it is easier to displace the starting position of the reciprocating movement than to displace the said article placing means.

If the apparatus comprises a cutting device for severing the tube along the seams, the distance between the cutting device and the heating and pressing members will be adjustable, according to the invention, since this distance should be adjusted in accordance with the spacing of the seams, which is changed when changing over to articles of a different size.

Advantageously, according to the invention, a clamping jaw and an abutment may be associated with the cutting device, the said clamping jaw and abutment being connected with the transmission means in such a manner that the jaw and the abutment remain in closed position during the return stroke of the heating and pressing members. Hereby a clamping of the end of the tube between the clamping jaw and the abutment is obtained simultaneously with the cutting, so that it will not be necessary to provide the apparatus with special means for preventing the tube from being moved against its feeding direction during the return stroke of the heating and pressing members.

According to the invention, the connection of the jaw and the abutment to the said transmission means may be such that the jaw and the abutment are opened before the heating and pressing members are re-engaged with the tube, and the apparatus may be constructed with means for stopping the operation in this position. Hereby the advantage is obtained that the packing tube, or the strip of material from which this is made, can be freely displaced in the apparatus when this is at rest, whereby the introduction of the packing material preparatory to the starting up of the operation is facilitated.

Figure 6:
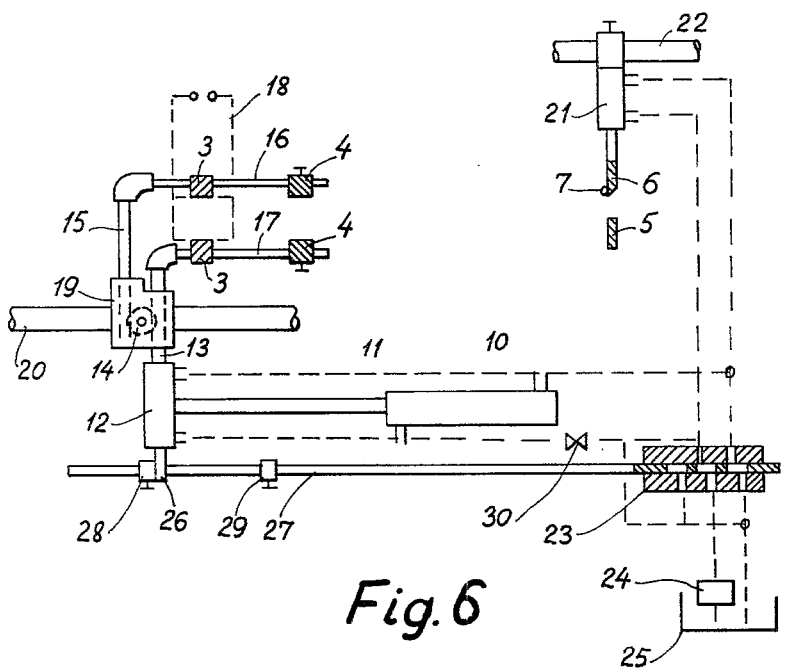

The invention will now be described in further detail with reference to the accompanying drawing in which FIGS. 1–5 illustrate various stages of the method according to the invention, and FIG. 6 diagrammatically illustrates one form of an apparatus according to the invention, only such parts being shown as are necessary for explaining the principles of the invention.

In the drawing, 1 is a tubular packing material. This tube may consist of a thermoplastic material or of wax paper or another heat sealable material or may be coated with such a material. The tubular shape is produced by the longitudinal heat sealing of the edges of a strip of material after a row of articles 2, e.g., ice cream lollies, have been placed on the strip.

3 is two electrically heated heating elements arranged on opposite sides of the tube 1. These heating elements are adjustably connected with pressure shoes 4 which are likewise arranged on opposite sides of the tube 1. In the drawing, the heating elements 3 and the pressure shoes are shown in section because they may extend transversely of a plurality of tubes 1 extending side by side.

Figure 2:
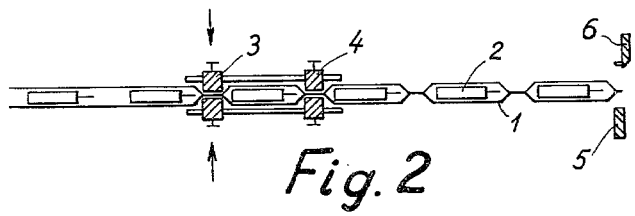
Figure 3:
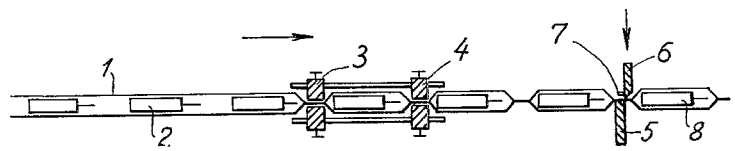

As illustrated in FIG. 2, the heating elements and the pressure shoes are clamped together whereby the heating elements are engaged with the tube in the interval behind an article, as viewed in the feeding direction, while the pressure shoes are engaged with the tube in the interval in front of the article. Thereafter, the pressure shoes and the heating elements are displaced as a whole to the right, such as illustrated in FIG. 3, through a distance equal to the pitch of the row of articles. During this displacement the portion of the tube behind the article is heated, while the portion of the tube in front of the articles is compressed and cooled, it being understood that the latter portion of the tube was heated in the beforegoing cycle of operations.

Figure 4:
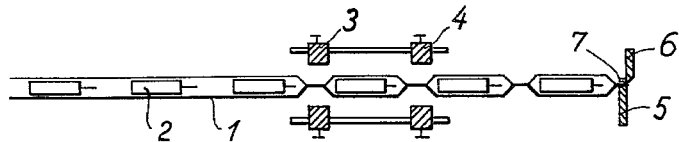
Figure 5:
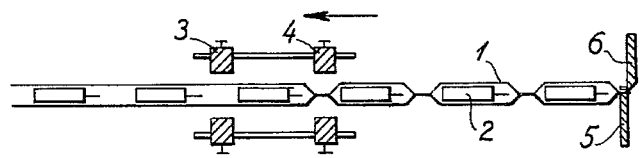

During the forward movement, the foremost article in the row, which has already been enclosed between two sealing seams, is pushed through a cutting device consisting of an abutment 5 and a knife 6, the latter carrying a resilient clamping jaw 7 on the side thereof facing the row. When the row has been fed a step forward corresponding to the pitch of the row, as illustrated in FIG. 3, the cutting device is closed, and the foremost article 8 of the row is thereby cut free. Simultaneously with the closing movement of the cutting device, the seam which is being severed is clamped between the abutment 5 and the jaw 7. When this clamping has been established, the heating elements and the pressure shoes are withdrawn from the tube, as illustrated in FIG. 4, and are moved backwards against the feeding direction through a distance equal to the pitch of the row to the position illustrated in FIG. 5. Only when the heating elements and pressure shoes have reached this position is the cutting device 5, 6 opened, and this opening takes place immediately before the heating elements and the pressure shoes are again engaged with the tube, so that the positions of the parts illustrated in FIG. 1 will exist for a short time only. In the case of interruption of the operation, the parts are stopped in these positions.

FIG. 6 illustrates a very simple form of an apparatus for carrying out the method described. The principal movement of the apparatus is derived from a hydraulic cylinder 10 which is attached to the frame of the apparatus in a manner not illustrated. A second hydraulic cylinder 12 is attached to the free end of the plunger 11 of the hydraulic cylinder 10. The free end of the plunger 13 of the hydraulic cylinder 12 is constructed as a toothed rack. This is coupled through a reversing gear 14 to another toothed rack 15. Each rack carries a heating element 3 and a pressure shoe 4. The distance of the pressure shoes from the respective heating elements may be adjusted in accordance with the length of the articles to be packed by displacement of the pressure shoes on supporting rods or means 16 and 17. The heating elements 3 are connected in parallel in a heating circuit 18. The reversing gear 14 and the portions of the racks 13 and 15 in engagement therewith are mounted in a housing 19 which is displaceably mounted on a rail 20.

A third hydraulic cylinder 21, which is displaceably mounted on a rod 22, serves to operate the cutting device 5, 6.

The apparatus is controlled by means of a slide valve 23 to which pressure oil is fed from a reservoir 25 by means of an oil pump 24. The changeover of the valve 23 is effected by the operation of the hydraulic cylinder 10, the plunger 11 of the latter being provided at its end with a fork 26 engaging a guiding rod 27 on which two stops 28 and 29 are adjustably mounted.

The described apparatus operates as follows:

In the position of the parts illustrated in the drawing, the pump 24 communicates through the valve 23 with the lower end of the cylinder 21 so that the cutting device assumes its open position. Moreover, the pump communicates with the lower end of the cylinder 12 so that the rack 13 is moved upwards and the rack 15 downwards to engage the heating elements 3 and the pressure shoes 4 with the packing tube, not illustrated in the drawing. When this engagement has taken place, the cylinder 10 moves the plunger 11 inwards since the left hand end of the cylinder communicates with the pressure fluid source. Thereby, the forward movement of the packing tube is produced, i.e., the movement which the tube performs from the position illustrated in FIG. 2 to the position illustrated in FIG. 3. Upon termination of this feeding movement, the fork 26 strikes the stop 29 and thereby changes over the slide valve 23 so that communication is now established from the pressure fluid source 24 to the upper end of the cylinder 21 whereby the cutting device is closed so as to assume the position illustrated in FIG. 3. Thereafter, the heating elements and pressure shoes are withdrawn from the tube owing to the fact that the upper end of the cylinder 12 is put in communication with the pressure fluid source, and finally the plunger 11 is moved outwards owing to the fact that the right hand end of the cylinder 10 is put in communication with the pressure fluid source. Thereby, the pressure shoes and the heating elements are moved back to the stopping position illustrated in FIG. 1. Immediately before this position is reached, the valve 23 is changed over so that the cutting device is opened, and the described operation is repeated. By closing a valve 30, the apparatus is stopped in the position illustrated in FIG. 6.

When changing over to the packing of articles of different size, the distance between the heating elements 3 and the pressure shoes 4 is adjusted in accordance with the length of the articles, and at the same time the distance between the stops 28 and 29 is adjusted in accordance with the length of the article. If the articles 2 are placed in the tube 1 in the same position irrespective of the length of the articles, the stops 28 and 29 are moreover adjusted in such a manner that the distance from these to the position where the articles are placed is an integral multiple of the pitch of the row of articles. It will be understood that displacement of the stops 28 and 29 corresponds to a displacement of the starting position of the reciprocating movement which the housing 19 and thereby the heating elements and the pressure shoes perform. Finally, the cylinder 21 is adjusted on the rod 22 in such a manner that the distance between the cutting device and the pressure shoes is an integral multiple of the pitch.

Since the pressure shoes 4—4 may become relatively hot in continued operation over a long period of time, they may be provided with cooling means, e.g., in the form of cooling passages for cold water or brine.

It is observed that the illustration in FIG. 6 of the hydraulic equipment of the apparatus is purely diagrammatical, the valves and conduits necessary for obtaining the correct operational sequence in each of the end positions of the slide valve 23 being omitted.

I claim:
1. The method of individually packaging and sealing articles in a tube of heat sealable material, comprising the steps of: placing said articles at uniform intervals within and lengthwise of said tube, clamping and heat sealing said tube in a zone extending transversely across the tube on one side of each article while at the same time clamping and cooling said tube on the opposite side of said article along a second zone extending transversely across said tube and spaced from the first zone a distance equal to said uniform intervals, while maintaining the clamping of said tube in both said zones, moving said tube in a predetermined lengthwise direction from said first zone toward said second zone for a distance equal to the said uniform intervals, again clamping and heat sealing said tube in a zone extending transversely across the tube and spaced from said first zone in a direction remote from said second zone and at a distance therefrom equal to said uniform intervals, while at the same time clamping and cooling said first zone and again moving the tube in said predetermined direction for a distance equal to said uniform intervals.

2. The method of claim 1 including the further steps of clamping said tube along a fourth zone spaced from each of said earlier mentioned zones a distance divisible by said uniform intervals, to hold it stationary during the period between said clamping of the tube along said first and said third zones.

3. Apparatus for forming transversely disposed heat sealed seams at uniform intervals across a packing tube of heat sealable material comprising supporting means disposed for reciprocation through an advanced stroke in a predetermined direction and means for causing such reciprocation, a pair of heated sealing and clamping members carried by said supporting means and a pair of relatively cooler clamping and pressing members carried by said supporting means, the members of each said pair being disposed on said supporting means for movement toward and away from each other into and from clamping engagement with a packing tube of heat sealable material extending through and between the respective pairs of members in said predetermined direction, said pairs of members being relatively spaced apart in said predetermined direction a distance equal to the length of said reciprocating strokes, means for urging the said members of both pairs into clamping engagement with said tube at the inception of each advance stroke and for retracting them from said tube prior to each retraction stroke of said supporting means, whereby reciprocation of the said pairs of members and supporting means will intermittently advance said tube in uniform increments in said predetermined direction, and said pressing members will engage and cool identical areas of said tube previously engaged by said heat sealing members, a cutting device normally fixed against movement in the direction of said reciprocation, said device being aligned with said pairs of members and spaced from said pressing members in said predetermined direction a distance divisible by the length of said reciprocating stroke, whereby to sever the said tube into lengths along areas previously engaged by said heated sealing members and by said relatively cooler clamping and pressing members, said apparatus further comprising an abutment and a clamping jaw normally on opposite sides of said tube, said clamping jaw being carried by said cutting device for movement toward said abutment to clamp said tube between said abutment and said jaw on each severing actuation of the cutting device, and means for maintaining said device in its actuated position throughout the return stroke of said supporting means, whereby to prevent reverse movement of the packing tube.

References Cited by the Examiner

UNITED STATES PATENTS

| 2,469,975 | 5/1949 | McClay | 53—29 |
| 2,893,187 | 7/1959 | Tebbutt | 53—180 |
| 2,958,169 | 11/1960 | Flax | 53—180 X |
| 3,011,294 | 12/1961 | Pancratz | 53—180 X |
| 3,050,916 | 8/1962 | Gausman et al. | 53—182 |

FRANK E. BAILEY, *Primary Examiner.*

BROMLEY SEELEY, *Examiner.*

W. M. COHEN, S. ABEND, *Assistant Examiners.*